L. A. FUNK.

MANURE SPREADER.

APPLICATION FILED JAN. 17, 1911.

Reissued Feb. 20, 1912.

13,369.

2 SHEETS—SHEET 1.

Witnesses,

Ella Rea X Sterne

E. E. Lundin

Lewis A. Funk, Inventor.

By Robert S. Carr.

Atty.

L. A. FUNK.

MANURE SPREADER.

APPLICATION FILED JAN. 17, 1911.

Reissued Feb. 20, 1912.

13,369.

2 SHEETS—SHEET 2.

Witnesses.

Ella Rea Sterne.

E. E. Lundin.

Lewis A. Funk, Inventor.

By Robert S. Carr.

Att'y.

UNITED STATES PATENT OFFICE.

LEWIS A. FUNK, OF JEROMESVILLE, OHIO, ASSIGNOR TO THE RUDE BROS. MFG. CO., OF LIBERTY, INDIANA, A CORPORATION OF INDIANA.

MANURE-SPREADER.

13,369. Specification of Reissued Letters Patent. Reissued Feb. 20, 1912.

Original No. 971,436, dated September 27, 1910, Serial No. 555,652. Application for reissue filed January 17, 1911. Serial No. 603,183.

*To all whom it may concern:*

Be it known that I, LEWIS A. FUNK, a citizen of the United States of America, residing at Jeromesville, in the county of Ashland and State of Ohio, have invented new and useful Improvements in Manure-Spreaders, of which the following is a specification.

This invention relates to manure spreaders, and it has for its object to provide a device of simple and improved construction which may be readily applied to and used in connection with most, if not all, of the manure spreading machines which are now in general use for the purpose of increasing the efficiency of the same.

A further object of the invention is to provide a spreader attachment comprising a pair of auxiliary spiked rolls adapted to be used in connection with the ordinary well known spiked spreading cylinder, said auxiliary rolls being disposed in V-shape adjacent to the main spreading cylinder for the purpose of discharging the manure laterally or sidewise, thus covering an increased area and also causing the manure to be more thoroughly broken and more evenly distributed than heretofore.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the invention may be resorted to when desired.

Figure 1:
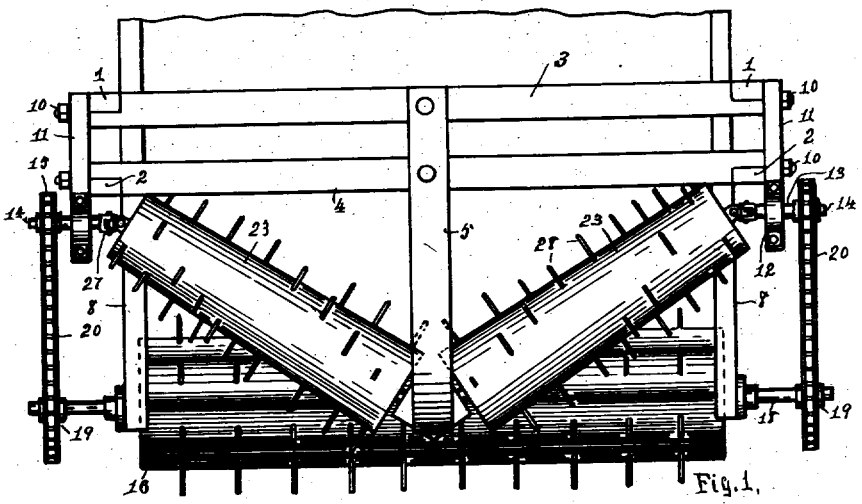
Figure 2:
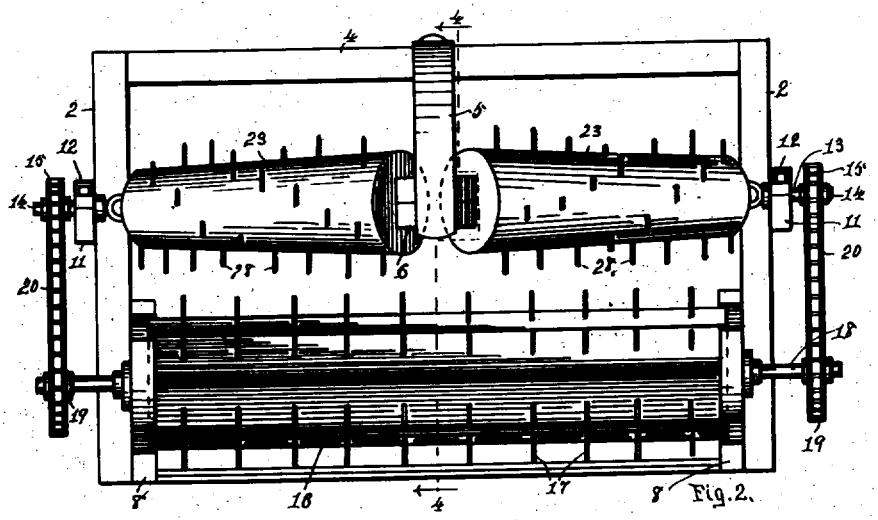
Figure 3:
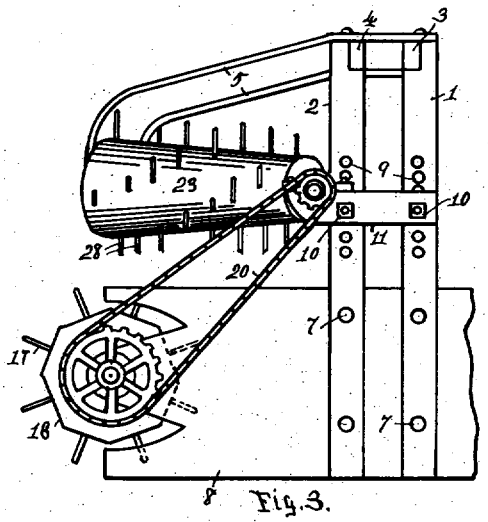
Figure 5:
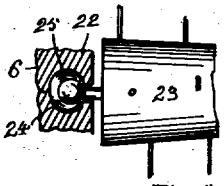
Figure 4:
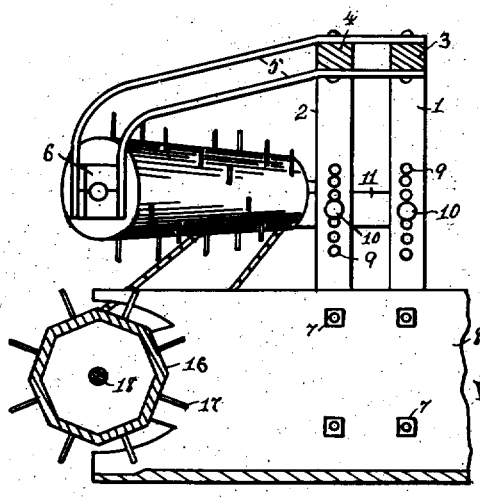
Figure 6:
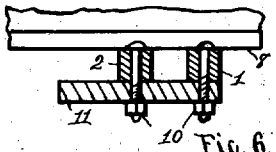

In the drawings, Figure 1 is a top plan view, showing the improved attachment applied to the bed of an ordinary manure spreader. Fig. 2 is a rear elevation of the same. Fig. 3 is a side elevation. Fig. 4 is a vertical sectional view, taken on the plane indicated by the line 4—4 in Fig. 2. Fig. 5 is a sectional detail view, showing a portion of the inner end of one of the auxiliary rolls, together with a portion of the block affording a bearing for the same. Fig. 6 is a sectional detail view taken on the plane indicated by the line 6—6 in Fig. 3.

Corresponding parts in the several figures are denoted by like characters of reference.

The improved device includes a frame comprising four legs or uprights, namely, the front legs 1, 1 and the rear legs 2, 2, said front legs being connected together by a cap piece 3, and said rear legs being in like manner connected together by a cap piece 4. The front and rear cap pieces are connected together and spaced apart by arms 5 which are extended rearwardly and downwardly to form brackets supporting between them a bearing block 6. The front and rear legs or uprights 1 and 2 are in practice bolted or otherwise firmly secured by means of fastening members 7 upon the side members of the bed 8 of an ordinary manure spreader, a portion of which has been shown in the drawing. The legs or uprights will thus be held securely in proper position with relation to one another, as indicated in the drawings. The several legs or uprights are provided with apertures 9 for the passage of fastening members, such as bolts 10, whereby brackets or bearing members 11 are mounted securely in position upon the legs or uprights at the side of the device for vertical adjustment. The brackets or bearing members 11 are provided with boxes 12 including anti-friction sleeves 13 wherein short shafts 14 are supported for rotation, said shafts being provided at their outer ends with sprocket wheels 15.

The main distributing cylinder 16, which is common to a great many forms of manure spreaders of well known construction, is supported for rotation in suitable bearings adjacent the rear end of the bed 8, said cylinder being provided with radially extending teeth or spikes 17. The shaft 18 carrying the cylinder 16 is provided at its outer end with sprocket wheels 19 which are connected by chains 20, with the sprocket wheels 15 upon the shafts 14 to which latter rotary motion will thus be transmitted from the main distributing cylinder which is to be driven in any suitable and well known manner, according to the construction of the spreading machine of which it forms a part. With the understanding that the cylinder shaft 18 is to be driven by power derived from any suitable source, no further description of the operation of this part of the device need be given, it being well understood that the distributing in machines of this kind must be driven and is usually actuated by power derived from the transporting wheels of the machine.

Shafts 22 extending through the auxiliary rollers 23 are provided adjacent to their inner ends with approximately spherical heads 24 which are supported for rotation in suitable recesses 25 in the block or boxing 6 which is supported by the bracket members 5, as hereinbefore described. The outer ends of the shafts 22 are connected by knuckle joints 27 with the shafts 14, thus providing connecting means whereby the auxiliary rollers may be rotated. It will be observed that the auxiliary rollers are set in V-shaped relation to one another, and that the teeth 28 with which the auxiliary rollers are provided are disposed in spiral arrangement around said rollers. Said rollers, moreover, are preferably made of the frusto-conical shape indicated in the drawings, although it is desired to be understood that no limitation is made to this particular shape.

From the foregoing description, taken in connection with the drawings hereto annexed, the operation and advantages of this invention will be readily understood by those skilled in the art to which it appertains.

The improved attachment may be readily applied to a great many well known forms of manure spreading machines, the only requirement being that the shaft of the main distributing cylinder shall be extended sufficiently to enable it to carry the sprocket wheels 19 from which motion is transmitted to the auxiliary cylinders or rollers of the attachment.

The device may be readily mounted in position by simply bolting the legs or uprights 1, 2 upon the sides of the spreader bed. When the device is thus mounted and provision is made for the transmission of motion to the auxiliary rollers, the efficiency of the machine will be greatly increased because the manure, which is fed in the direction of the distributing members, will be subjected to the action of not only the spiked cylinder 16 but to the auxiliary cylinders 23, whereby the manure will be discharged laterally toward both sides of the machine, thus covering a much greater area than would otherwise be covered and also causing the manure to be more finely broken up and disseminated.

The improved attachment is simple in construction, easily applied and thoroughly efficient for the purpose for which it is provided.

Having thus described the invention, what is claimed as new, is:—

1. The combination of a bed, a frame removably secured thereon, and similar distributing rollers journaled on the frame with their axes inclined at an angle to the plane of the bed.

2. The combination of a bed, a main distributing cylinder journaled thereon, a frame removably secured on the bed, and an auxiliary distributing roller journaled on the frame above the bed with its axis inclined and at an oblique angle to the axis of the cylinder.

3. The combination of a bed, a main distributing cylinder journaled thereon, and similar auxiliary distributing rollers supported above the bed with their axes at an inclination to the plane thereof.

4. The combination of a bed, and a distributing roller journaled thereover with its axis at an angle to the length thereof and adjustable in different vertical angles.

5. The combination with a bed and a main distributing cylinder thereon, of a frame provided with a bracket and removably secured on the bed, bearings vertically adjustable on the frame, and auxiliary distributing rollers journaled in the bracket and bearings for coöperating with the cylinder.

6. A manure spreader comprising a bed, a cylinder supported thereon for distributing the lower portion of the contents of the bed in a rearward direction, and a pair of rollers constructed and arranged each with its axis at an angle to the horizontal for distributing the upper portion of the contents of the bed in respective laterally divergent directions.

7. A manure spreader comprising a bed, a pair of similar distributing rollers supported thereon, said distributing rollers being arranged with their axes in a common inclined plane and at an angle to each other, and driven connections therewith.

8. A manure spreader comprising a bed, a cylinder journaled thereon for distributing the lower portion of the contents of the bed in a rearward direction, rollers supported on the bed and arranged with their axes at an angle to the horizontal and also at an angle to each other for distributing the upper portions of the contents of the bed in respective laterally divergent directions, and driven connections for actuating the rollers.

9. A manure spreader comprising a bed, a distributing cylinder journaled transversely thereon, a distributing roller journaled with its axis at an angle to the sides of the bed, and adjustable with its axis into different vertical angles, and driven connections therewith.

10. A manure spreader comprising a bed, a main distributing cylinder journaled transversely thereon, a pair of auxiliary distributing rollers mounted to turn on axes at an angle to each other and to the sides of the bed, means for vertically adjusting one end of each of said pair of rollers, and driven connections with the cylinder and rollers.

11. In a manure spreader, the combination with the bed, and a straight distributing cylinder journaled transversely thereon, of a distributing roller supported with one end of its axis above the cylinder and extending in a forward direction at an angle to the plane of rotation thereof and driven connections with said roller and cylinder.

12. A manure spreader comprising a bed, a pair of distributing rollers journaled thereon with their axes of rotation at an angle to each other and independently adjustable in different vertical angles.

13. An attachment for manure spreaders comprising a frame and a pair of distributing rollers journaled thereon with their axes independently adjustable in different vertical angles.

14. An attachment for manure spreaders comprising a frame having a rearwardly extending bracket, bearing members vertically adjustable on the sides of the frame, and distributing rollers journaled in the bracket and the respective bearing members with their axes at an angle to each other.

15. A manure spreader comprising a body, a beater journaled transversely thereon, a pair of beaters supported in an upward and forward direction thereover and at an obtuse angle to each other, and driven connections for actuating the beaters simultaneously.

16. A manure spreader comprising a body, two similar beaters supported thereon, said beaters being arranged to turn on axes at an angle to each other and in a common inclined plane, and driven connections for actuating said beaters.

17. A manure spreader comprising a body, a beater journaled thereon for distributing the lower portion of the load in a rearward direction, beaters supported on the body and arranged at an angle to each other for distributing the upper portion of the load in respective laterally divergent directions, and driven connections for actuating the beaters simultaneously.

18. A manure spreader comprising a body, a pair of beaters supported thereon and arranged to turn on rearwardly and upwardly converging axes, a beater supported thereunder on the body parallel with the line connecting the opposite ends of said pair of beaters, and driven connections for actuating said beaters simultaneously.

19. A manure spreader comprising a body, a beater journaled to turn thereon, a pair of beaters mounted to turn on rearwardly and upwardly converging axes having their opposite ends on a line parallel with the axis of the former beater, and driven connections for actuating the beaters simultaneously and in the same direction.

20. The combination of a bed, a distributing cylinder of uniform diameter supported transversely thereon, and distributing rollers each supported with one end above the cylinder and with their axes diverging in a forward direction at equal angles to the plane of rotation of said cylinder, and connections for driving the rollers and cylinder.

21. The combination of a bed, a distributing cylinder of uniform diameter journaled transversely thereon, and a pair of distributing rollers journaled in a plane above the cylinder and with their axes diverging in a forward direction at an obtuse angle to each other, and means for driving the cylinder and the rollers.

22. A manure spreader comprising a bed, a straight cylinder supported on the rear portion of the bed for distributing the lower portion of the contents thereof directly in a rearward direction, and a pair of rollers constructed and arranged with their axes diverging in a forward direction and in a plane above the cylinder for distributing the upper portion of the contents of the bed in respective laterally divergent directions, and connections for driving the cylinder and rollers simultaneously.

23. A manure spreader comprising a bed, a cylinder journaled thereon, and a roller supported above the bottom of the bed with its axis of rotation in an inclined plane at an oblique angle to the axis of the cylinder for coöperating with the cylinder to distribute the material fed thereto over an area wider than the bed.

LEWIS A. FUNK.

Witnesses:

GLENN W. FUNK,

C. C. CHAPMAN.